2,990,425
NEW BIGUANIDE SALTS
Norman Senior, Manchester, England, assignor to Imperial Chemical Industries Limited, London, England, a corporation of Great Britain
No Drawing. Filed May 20, 1957, Ser. No. 660,034
Claims priority, application Great Britain June 6, 1956
1 Claim. (Cl. 260—501)

This invention relates to new biguanide salts and more particularly it relates to new bis-biguanide salts which possess useful therapeutic properties.

According to the invention we provide new salts of bis-biguanides of the formula:

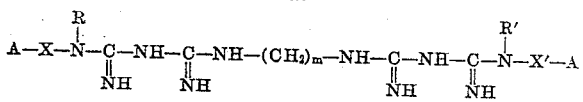

wherein A stands for a phenyl radical which may be substituted by alkyl, alkoxy, or nitro groups or by halogen wherein the two A's may be the same or different, wherein R and R', which may be the same or different, stand for hydrogen or for an alkyl radical or an aralkyl radical, wherein X and X', which may be the same or different, stand for a direct linkage or for an alkylene radical of not more than 3 carbon atoms, wherein $m$ is an integer from 2 to 12 inclusive and wherein the polymethylene chain $(CH_2)_m$ may optionally be interrupted, for example by oxygen atoms and/or by aromatic nuclei, with polyhydroxycarboxylic acids.

As suitable polyhydroxycarboxylic acids there may be mentioned for example those polyhydroxycarboxylic acids which may be obtained by the oxidation of sugars, for example D-gluconic acid.

As a particularly useful bis-biguanide of the above stated formula there may be mentioned the compound wherein A stands for a p-chlorophenyl radical, R and R' stand for hydrogen, X and X' stand for direct linkages and $m$ is 6 namely the compound 1:6-di-($N_1$:$N_1'$-p-chlorophenyldiguanido-$N_5$:$N_5'$)hexane.

As a particularly valuable salt there may be mentioned for example 1:6-di-($N_1$:$N_1'$-p-chlorophenyldiguanido-$N_5$:$N_5'$)hexane di-D-gluconate.

According to a further feature of the invention we provide a process for the manufacture of the said new bis-biguanide salts which comprises interaction of a polyhydroxycarboxylic acid or a salt thereof with a bis-biguanide of the above stated formula or a salt thereof.

The process, in the case where the polyhydroxycarboxylic acid is interacted with the bis-biguanide base, may conveniently be carried out in a liquid medium, for example and preferably, especially to enable a lactone of the polyhydroxycarboxylic acid to be used, water. Thus a preferred polyhydroxycarboxylic acid is D-gluconic acid and this acid may be conveniently used in the form of its lactone, D-glucono-delta-lactone. Alternatively a salt of the polyhydroxycarboxylic acid, for example an alkaline earth metal salt, may be interacted in an aqueous medium with a salt of the bis-biguanide and an acid, such that the salt of the acid with the cation forming the salt of the polyhydroxycarboxylic acid is insoluble in water.

In contrast to the sparing solubility in water of salts of the bis-biguanides of the above formula derived from the common inorganic acids, for example the hydrochlorides, or from the common organic acids, for example the acetates, the new bis-biguanide salts of the invention, derived from polyhydroxycarboxylic acids, are highly soluble in water. The salts of the invention, in common with these earlier salts, possess a wide spectrum of antimicrobial action and are therefore useful for many purposes, for example as antibacterial agents in medical and surgical practice for the sterilisation of instruments or of body tissues and body cavities, as antifungal agents, as rubber preservatives and as mothproofing agents for textiles. The said additional property of high solubility in water possessed by the new bis-biguanide salts renders them even more useful than the known, less soluble, salts of the said bis-biguanides since there are obvious practical disadvantages in use of the known salts which are attributable to a lack of this property.

Thus according to yet a further feature of the invention we provide antimicrobial compositions comprising as active antimicrobial agent one or more of the new salts of the invention.

As examples of such compositions there may be mentioned especially equeous solutions of the said new salts for example aqueous solutions of 1:6-di-($N_1$:$N_1'$-p-chlorophenyldiguanido-$N_5$:$N_5'$)hexane di-D-gluconate.

The said aqueous solutions may also contain additional ingredients for example wetting or surface active agents. Suitable wetting or surface active agents may be for example condensation products of alkyl phenols for example octylcresol with ethylene oxide particularly the condensation product of octylcresol with 8–10 molecular proportions of ethylene oxide. Further wetting or surface active agents may be long chain quaternary salts for example cetrimide which consists substantially of hexadecyltrimethylammonium bromide together with smaller amounts of related alkyltrimethylammonium salts. Such long chain quaternary salts also possess antibacterial properties and when used as the wetting or surface active agent there are obtained compound solutions possessing antibacterial and detergent properties.

The antimicrobial compositions may also be in the form of oil-in-water emulsions or other aqueous preparations for example aqueous gels or in the form of creams, ointments or pastes for external use for example by application to the skin. Such preparations may contain any suitable excipients as are known to the pharmacist's art. Thus the aqueous gelled preparations may contain watermiscible agents known to be useful in preparations intended for application to the skin for example glycerol together with gelling or thickening agents for example ethylcellulose. The said oil-in-water emulsions or cream preparations may contain non-toxic hydrocarbon products for example liquid paraffin or white or yellow soft paraffin together with fatty alcohols for example cetostearyl alcohol and cetomacrogol 1000 P.B.C. (a waxy unctuous product obtained from condensation of cetyl or cetostearyl alcohol with ethylene oxide) and/or suitable non-toxic animal or vegetable fats or oils for example lanoline or arachis oil and optionally wetting or surface active agents such as those already mentioned above. The presence of cetrimide as a wetting or surface active agent confers not only wetting or surface active properties on the composition but also antibacterial properties additional to those of the bis-biguanide salt itself. The said ointments or pastes may be formulated in a paraffin base for example white or yellow soft paraffin which may contain additional ingredients for example animal fats for example lanoline.

The invention is illustrated, but not limited, by the following examples, in which the parts are by weight:

*Example 1*

A mixture of 505 parts of 1:6-di-($N_1$:$N_1'$-p-chlorophenyldiguanido-$N_5$:$N_5'$)hexane and 356 parts of D-glucono-delta-lactone is dissolved in 1000 parts of water. The solution is then filtered and the filtrate is evaporated to dryness at 100° C. under reduced pressure. The residue is then extracted with dry ether and 1:6-di-($N_1$:$N_1'$-p-chlorophenyldiguanido-$N_5$:$N_5'$)hexane di-D-gluconate remains as a white amorphous solid. The product may be dissolved in water to provide an aqueous solution possessing antibacterial properties.

*Example 2*

10 parts of 1:6-di-($N_1$:$N_1'$-p-chlorophenyldiguanido-$N_5$:$N_5'$)hexane, 8.5 parts of water and 7.1 parts of D-glucano-delta-lactone are mixed together to give an aqueous solution containing 1:6-di-($N_1$:$N_1'$-p-chlorophenyldiguanido-$N_5$:$N_5'$)hexane di-D-gluconate. The solution is evaporated to dryness at 100° C. under reduced pressure. The residue is then extracted with dry ether and 1:6 - di - ($N_1$:$N_1'$ - p - chlorophenyldiguanido - $N_5$:$N_5'$)-hexane di-D-gluconate remains as a white amorphous solid. The product may be dissolved in water to provide an aqueous solution possessing antibacterial properties.

*Example 3*

10 parts of 1:6-di-($N_1$:$N_1'$-p-chlorophenyldiguanido-$N_5$:$N_5'$)hexane digluconate are dissolved in 90 parts of water and there is thus obtained an aqueous solution possessing antibacterial properties.

*Example 4*

To a solution of 40 parts of 1:6-di-($N_1$:$N_1'$-p-chlorophenyldiguanido-$N_5$:$N_5'$)hexane digluconate in 40 parts of water are added 20 parts of a condensation product obtained from octyl cresol and 8–10 molecular proportions of ethylene oxide. There is thus obtained an aqueous solution possessing antibacterial properties.

*Example 5*

To a solution of 3 parts of 1:6-di-($N_1$:$N_1'$-p-chlorophenyldiguanido-$N_5$:$N_5'$)hexane digluconate in 82 parts of water are added 15 parts of cetrimide and the mixture is stirred until a clear solution is formed. There is thus obtained an aqueous solution possessing antibacterial properties.

*Example 6*

A solution of one part of 1:6-di-($N_1$:$N_1'$-p-chlorophenyldiguanido-$N_5$:$N_5'$)hexane digluconate in 89 parts of water is heated to 65° C. and is then added to a mixture of 4 parts of liquid paraffin, 4 parts of cetostearyl alcohol and 2 parts of cetomacrogol 1000 B.P.C. at a temperature of 65° C. The mixture thus obtained is cooled and homogenised by any means known to the art and there is thus obtained an antiseptic composition which may be used for external purposes for example by application to the skin.

*Example 7*

A mixture of 1 part of 1:6-di-($N_1$:$N_1'$-p-chlorophenyldiguanido-$N_5$:$N_5'$)hexane digluconate, 2 parts of ethylcellulose, 2 parts of glycerol and 95 parts of water is agitated until it is homogeneous and completely gelled. There is thus obtained an antiseptic composition which may be used for external purposes for example by application to the skin.

*Example 8*

A solution of 1 part of 1:6-di-($N_1$:$N_1'$-p-chlorophenyldiguanido-$N_5$:$N_5'$)hexane digluconate and 0.5 part of cetrimide in 75.5 parts of water is heated to 65° C. and is then added to a mixture of 8 parts of cetostearyl alcohol, 10 parts of liquid paraffin and 5 parts of arachis oil at a temperature of 65° C. The mixture thus obtained is cooled and homogenised by any means known to the art and there is thus obtained an antiseptic composition which may be used for external purposes for example by application to the skin.

*Example 9*

A solution of 1:6-di-($N_1$:$N_1'$-p-chlorophenyldiguanido-$N_5$:$N_5'$)hexane digluconate in 0.5 part of water is added with stirring to a melted mixture of 10 parts of lanoline and 89.3 parts of yellow soft paraffin. There is thus obtained an antiseptic composition which may be used for external purposes for example by application to the skin.

What I claim is:

1:6 - di - ($N_1$:$N_1'$ - p - chlorophenyldiguanido - $N_5$:$N_5'$)-hexane di-D-gluconate.

References Cited in the file of this patent

UNITED STATES PATENTS

| | | |
|---|---|---|
| 2,131,127 | Horst | Sept. 27, 1938 |
| 2,449,987 | Gresham | Sept. 28, 1948 |
| 2,666,013 | Ferguson | Jan. 12, 1954 |
| 2,736,749 | Robinson | Feb. 28, 1956 |
| 2,769,746 | Clark | Nov. 6, 1956 |
| 2,783,276 | Boatright | Feb. 26, 1957 |
| 2,863,919 | Birtwell et al. | Dec. 9, 1958 |

FOREIGN PATENTS

| | | |
|---|---|---|
| 750,501 | Great Britain | June 20, 1956 |